United States Patent [19]

Weinert

[11] Patent Number: 4,918,361

[45] Date of Patent: Apr. 17, 1990

[54] TORQUE TRANSMITTING APPARATUS

[75] Inventor: Volker Weinert, Taufkirchen, Fed. Rep. of Germany

[73] Assignee: AGFA-Gevaert Aktiengesellschaft, Leverkusen, Fed. Rep. of Germany

[21] Appl. No.: 414,945

[22] Filed: Sep. 29, 1989

[30] Foreign Application Priority Data

Oct. 1, 1988 [DE] Fed. Rep. of Germany ....... 3833467

[51] Int. Cl.$^4$ .............................................. H02P 7/00
[52] U.S. Cl. .................................... 318/480; 318/433
[58] Field of Search ................ 318/432, 433, 434, 480

[56] References Cited

U.S. PATENT DOCUMENTS

| | | | |
|---|---|---|---|
| 2,167,484 | 7/1939 | Berry | 318/480 X |
| 2,425,541 | 8/1947 | Konet | 318/480 X |
| 2,945,167 | 7/1960 | Gunther | 318/480 X |
| 3,098,186 | 7/1963 | Williamson et al. | 318/480 X |
| 3,117,266 | 1/1964 | Raymond | 318/480 X |
| 3,193,744 | 7/1965 | Seward | 318/480 X |
| 4,736,140 | 4/1988 | Ernst | 318/480 X |

Primary Examiner—Bentsu Ro
Attorney, Agent, or Firm—Peter K. Kontler

[57] ABSTRACT

A reel for webs of photographic material can be driven clockwise and counterclockwise by a reversible d-c motor through the medium of the output shaft of the motor, a second shaft which is coaxial with the output shaft and serves to rotate the reel, and a torsion spring between the shafts. Each shaft carries a disc-shaped polarizing filter, and both filters extend across the path of propagation of radiation from the radiation source to the transducer of an analog optoelectronic detector. The characteristics of signals which are generated by the transducer vary as a function of the extent of angular displacement of the shafts and filters relative to each other. Such signals are transmitted to an evaluating circuit which controls the flow of energy to the motor as a function of deviations of the characteristics of transmitted signals from the characteristics of a reference signal. The purpose of the evaluating circuit is to ensure the transmission of constant torque to the second shaft irrespective of the direction of rotation of the motor.

17 Claims, 1 Drawing Sheet

TORQUE TRANSMITTING APPARATUS

BACKGROUND OF THE INVENTION

The invention relates to torque transmitting apparatus in general, and more particularly to improvements in apparatus for transmission of constant torque.

It is often necessary to rotate one or more components at a constant toque. Examples of such components are reels or spools for webs of photographic material in printing and like machines. In a printing machine, a combined takeup and payout reel or spool receives webs of photographic material from advancing bands or rolls, and the leader of a web is automatically attached to the core of the reel. The same set of advancing bands or rolls, or a different set, is used to draw the web off the reel and the trailing end (formerly the leader) of the web is automatically detached from the core of the reel. The reel should be driven with a constant force, i.e., the means for rotating the reel must transmit a constant torque, because any abrupt changes of torque can entail breaking of the web, inaccurate positioning of the web relative to the platform of the printer and other undesirable consequences. It is important to ensure that the reel be driven at a constant torque in both directions, i.e., to collect or to pay out a web of photographic film, photographic paper or the like.

OBJECTS OF THE INVENTION

An object of the invention is to provide a novel and improved torque transmitting apparatus.

Another object of the invention is to provide an apparatus which can transmit constant torque in clockwise and counterclockwise directions.

A further object of the invention is to provide the apparatus with novel and improved means for adjusting a reversible motor which transmits torque to one or more driven components, such as one or more reels or spools for photosensitive material.

An additional object of the invention is to provide novel and improved means for monitoring the extent of angular displacement of two rotary parts relative to each other.

Still another object of the invention is to provide a simple, compact and inexpensive but reliable and versatile apparatus for transmission of torque to reels for webs of photographic material or the like.

A further object of the invention is to provide a novel and improved method of automatically regulating the transmission of torque to one or more driven members.

SUMMARY OF THE INVENTION

The invention is embodied in a torque transmitting apparatus which comprises an adjustable electric motor (particularly a reversible d-c motor), a first rotary member which is driven by the motor (such rotary member can constitute the output shaft of the motor), a second rotary member which is coaxial with the first rotary member (the second rotary member can include or constitute a shaft which serves to rive a reel for webs of photographic material), a photoelectronic detector (particularly an analog detector) which includes a radiation source and a transducer disposed in the path of radiation issuing from the source and having an output serving to transmit signals the characteristics of which vary as a function of changes of intensity of radiation which impinges upon the transducer, resilient means (e.g., a torsion spring in the form of a coil spring) for transmitting torque between the rotary members, first and second polarizing filters which are rotatable with the respective members and extend across the path of propagation of radiation from the source to the transducer of the photoelectronic detector to vary the intensity of radiation which actually impinges upon the transducer as a function of angular displacement of the rotary members relative to each other against the resistance of the resilient means, and an evaluating circuit or other suitable means for adjusting the motor in response to variations of the characteristics of signals at the output of the transducer.

The adjusting means preferably includes a source of reference signals denoting the desired magnitude of torque which is transmitted by the first rotary member, and means for comparing the reference signals with signals at the output of the transducer. The adjusting means further comprises means for supplying to the motor d-c current at a potential which is proportional to the difference between the intensities and/or other characteristics of signals at the output of the transducer and those of the reference signals.

The rotary member normally assume predetermined starting angular positions relative to each other when the motor is idle. The arrangement is preferably such that the polarizing filters interrupt the propagation of radiation to the transducer in such starting positions of the rotary members relative to each other. The intensity of signals at the output of the transducer is preferably zero when the filters interrupt the propagation of radiation (e.g., light0 from the source to the transducer.

Each rotary member can be provided with a flange, and the polarizing filters can be mounted on the respective flanges. The rotary members have neighboring end portions, and the flanges are or can be provided on and rotate with the end portions of the respective rotary members. A first end portion of the resilient element (such as the aforementioned torsion spring in the form of a coil spring) can be affixed to the flange of one of the rotary members, and a second end portion of such spring is then affixed to the other flange.

The apparatus preferably further comprises means for limiting the extent of angular movability of the rotary members (and hence of the polarizing filters) relative to each other in response to the bias or against the opposition of the resilient element. The limiting means is preferably designed to limit the movability of the rotary members relative to each other to less than 180°, most preferably to less than 91°. Such limiting means can be provided on or in the flanges and can include a projection which shares the rotary movements of one of the flanges and is spaced apart from the common axis of the rotary members, and an arcuate recess which is provided in the other flange and receives at least a portion of the projection. The center of curvature of the arcuate recess is located on the common axis of the rotary members. The recess preferably extends along an arc of less than 91°.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
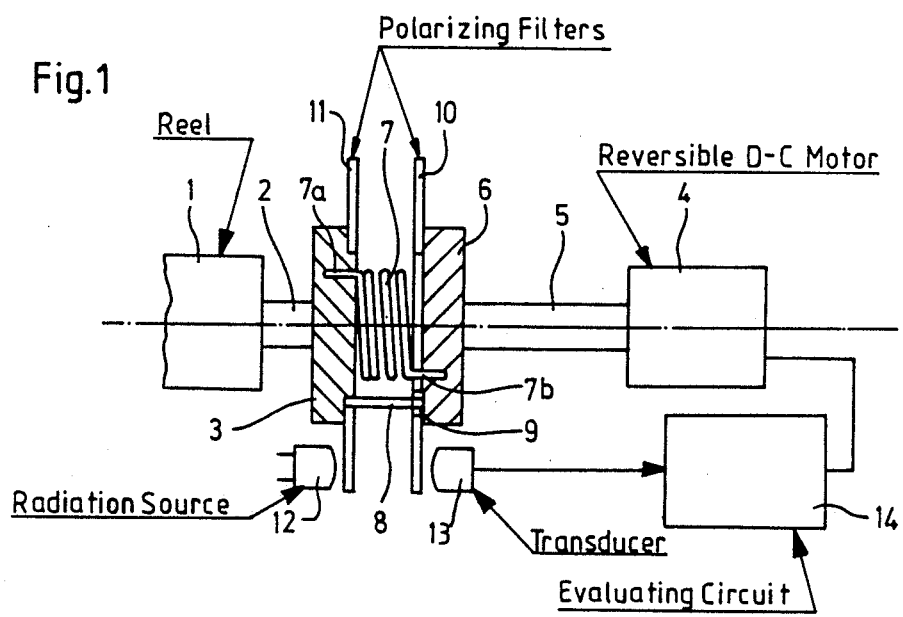
FIG. 1 is a schematic partly elevational and partly section view of a torque transmitting apparatus which embodies the invention.

FIG. 1 shows a rotary component 1 which can constitute a reel for collection and for paying out of webs of photographic material, e.g., webs of exposed or unexposed photographic roll film. The improved apparatus is designed to rotate the component 1 in a clockwise or counterclockwise direction in such a way that the component 1 receives constant torque. The apparatus comprises a reversible electric d-c motor 4 having an output shaft 5 which constitutes a first rotary member, a shaft 2 which drives the component 1 and is coaxial with the output shaft 5 and constitutes a second rotary member, a resilient element 7 in the form of a torsion spring which serves to transmit torque between the members 5 and 2, an evaluating circuit 14 which serves to adjust the motor 4, an analog photoelectronic detector including a radiation source 12 and a transducer 13 which latter transmits signals to the corresponding input of the circuit 14, and two disc-shaped polarizing filters 10, 11 which respectively share the angular movements of the shafts 5 and 2.

That end portion of the shaft 2 which is adjacent the shaft 5 carries a flange 3 which non-rotatably supports the filter 11. The filter 10 is non-rotatably secured to a flange 6 on that end portion of the shaft 5 which is adjacent the shaft 2. The resilient element 7 is a coil spring having a first end portion 7a anchored in or otherwise secured to the flange 3, and a second end portion 7b anchored in or otherwise secured to the flange 6.

When the motor 4 is idle, the shafts 2, 5 and hence the disc-shaped filters 10, 11 assume predetermined angular positions relative to each other. At such time, the filters 10 and 11 (each of which extends across the path P of propagation of radiation L from the source 12 toward the transducer 13) interrupt the propagation of radiation to the transducer 13 so that the signal α at the output of the transducer indicates that L (the amount of radiation impinging upon the transducer 13) is zero.

If the motor 4 is started in response to a signal from the evaluating circuit 14 or in any other suitable way, the shaft 5 beings to rotate and the torsion spring 7 stores a certain amount of energy while the shaft 5 rotates relative to the shaft 2. Once the spring 7 has stored a predetermined amount of energy, it begins to rotate the shaft 2, its flange 3, the filter 11 and the component 1 (provided that the shaft 2 is connected to the component 1). The magnitude of torque which the spring 7 transmits to the shaft 2 is a function of the angle α through which the shaft 5 is rotated by the motor 4 before the shaft 2 is set in rotary motion.

It is desirable to avoid excessive stressing of the spring 7, i.e., it is desirable to avoid excessive angular displacements of the shaft 5 relative to the shaft 2 before the component 1 is set in rotary motion. The angle α should not exceed 180°; as a rule, such angle will be less than 91°. The reason is that excessive turning of the shaft 5 relative to the shaft 2 before the latter beings to rotate with the shaft 5 would result in the establishment of entirely different torques and would lead to instability of regulation of the motor 4. Therefore, the apparatus comprises means for limiting the extent of angular movability of the shafts 2 and 5 relative to each other to less than 91°. Such limiting means comprises a projection 8 (e.g., a straight stud which is remote from and parallel to the common axis of the shafts 2 and 5) and an arcuate recess 9 (e.g., a relatively shallow arcuate groove) in that surface of the flange 6 which confronts the flange 3. The projection 8 is affixed to or forms part of the flange 3, and its tip extends into the recess 9. The center of curvature of the recess 9 is on the common axis of the shafts 2, 5 and the length of this recess determines the extent of angular movability of the shafts 2, 5 and polarizing filters 10, 11 relative to each other.

Other forms of limiting means can be used with equal or similar advantage. For example, the stud 8 on the flange can be disposed between two spaced-apart projections on the flange 6 (or vice versa) so that one of the projections limits the extent of angular movability of the shaft 5 relative to the shaft 2 in a clockwise direction and the other projection limits the extent of movability of the shaft 5 relative to the shaft 2 in a counterclockwise direction. Also, the positions of the stud 8 and recess 9 can be reversed.

Figure 2:
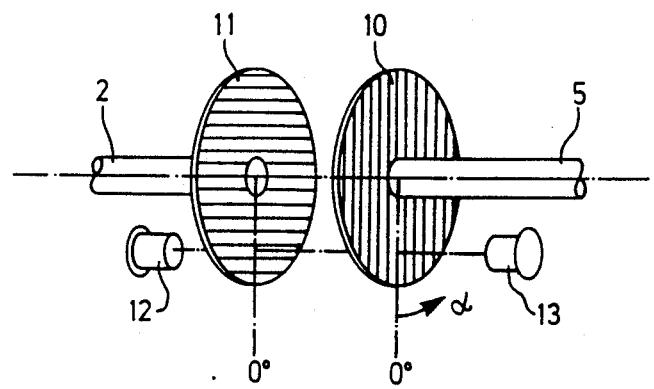
FIG. 2 is a fragmentary perspective view of the rotary members, polarizing filters and photoelectronic detector.
Figure 3:
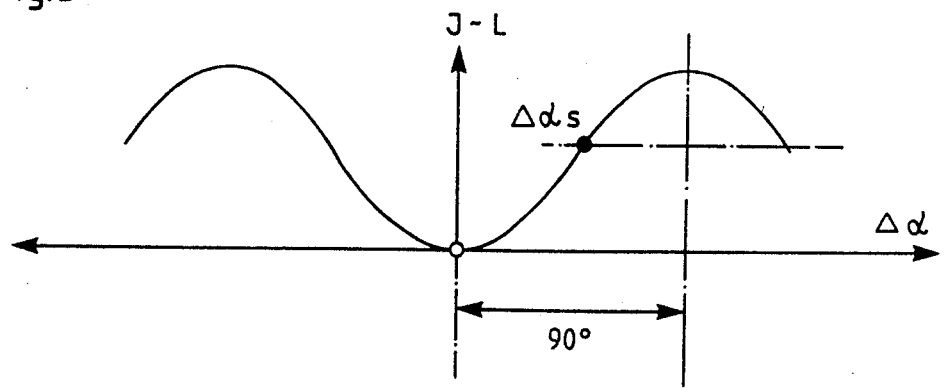
FIG. 3 is a diagram showing the changes of intensity of radiation as a function of changes of angular positions of the filters relative to each other.

In the diagram of FIG. 3, the angular displacement (Δα) off the shaft 5 relative to the shaft 2 is measured along the abscissa and the amount of radiation L which reaches the transducer 13 in different angular positions of the filters 10 and 11 relative to each other is measured along the ordinate. The amount or intensity of such radiation is proportional to the intensity or another characteristic of the signal α at the output of the transducer 13.

By way of example, the angle $\Delta\alpha_s$ at which the spring 7 begins to turn the shaft 2 subsequent to starting of the motor 4 in either direction can equal or approximate 45°. Such angle, and hence the energy which is stored by the spring 7, should thereupon remain unchanged in order to ensure that the magnitude of torque which is being transmitted to the shaft 2 remains constant.

The position of transmission planes of the polarizing filters 10 and 11 are such that the amount of radiation L reaching the transducer 13 in starting positions of the shafts 2 and 5 radiation L which reaches the transducer 13 by penetrating through the filters 10 and 11 rises to a maximum value when the shaft 5 is turned relative to the shaft 2 through an angle of 90°. In other words, the transmission planes of the filters 10, 11 cross each other when the angle α equals zero, and such planes are parallel to each other when the angle α equals 90°.

The intensity or another characteristic of the signal J which is transmitted by the output of the transducer 13 to the corresponding input of the evaluating circuit 14 is proportional to the amount of intensity of radiation L which impinges upon the transducer after having passed through the filters 10 and 11. The signal J is processed and the processed signal is used to adjust the motor 4 so as to ensure that the magnitude of torque which is applied to the shaft 2 remains constant. The circuit 14 generates an electric d-c signal a characteristic (particularly the voltage) of which is proportional to the value of L, and such signal is applied to the motor 4. The circuit 14 further includes an amplifier for the signal α at the output of the transducer 13 and a source of reference signals $J_s$ which are compared with signals $\alpha$ from the transducer. The reference signals $J_s$ are indicative of torque which should be transmitted when the angle $\Delta\alpha_s$ equals 45°. A signal comparing stage of the circuit 14 compares the signal J (at the output of the transducer 13) with the reference signals $J_s$, and the motor 4 is adjusted whenever the characteristics of a signal J depart form those of the reference signal $J_s$.

As mentioned above, the transmission planes of the polarizing filters 10 and 11 cross each other (at an angle of 90°) when the shafts 2, 5 assume their starting positions relative to each other so that the spring 7 does not store energy. At such time, the value of L is zero and the intensity of signal J at the output of the transducer 13 is also zero. The evaluating circuit 14 then intensifies the voltage signal which is transmitted to the motor 4. This causes the motor 4 to turn the shaft 5 relative to the shaft 2 so that the angle $\alpha$ is increased and reaches the value $\Delta\alpha_s$. The filters 10, 11 then transmit a corresponding amount of radiation L, i.e., the output of the transducer 13 transmits a signal J of predetermined intensity, namely j then equals $J_s$, and the circuit 14 thereupon regulates the motor 4 in such a way that the transmission of torque to the shaft 2 remains unchanged.

If the angular position of the shaft 5 relative to the shaft 2 or vice versa is increased above $\Delta\alpha_s$, e.g., because the component 1 offers excessive resistance to rotation with the shaft 2, the angular positions of the filters 10, 11 relative to each other change and the intensity of the signal J rises above that of the signal $J_s$. This entails a change of the signal which the circuit 14 transmits to the motor 4 so that the angular displacement of the shafts 2, 5 relative to each other is reduced back to 45°. Thus, the circuit 14 cooperates with the filters 10, 11 and with the detector 12+13 to ensure that the transmission of torque to the shaft 2 remains constant or that such torque is increased or reduced, depending on the angular positions of the filters 10, 11 relative to each other, i.e., in dependency on the amount of radiation L which reaches the transducer 13. The detector cooperates with the filters to monitor the departure of actual angular positions of the shafts 2, 5 from their starting positions, and the circuit 14 ensures that the angle $\Delta\alpha_s$ remains at a selected value (such as the aforementioned angle of 45°) when the motor 4 is on to drive the shaft 5 in a clockwise or in a counterclockwise direction.

The exact construction of the circuit 14 is known and need not be described here. Circuits which can evaluate signals from a transducer and compare such signals with a reference value prior to transmitting signals which are proportional to differences between the signals from a transducer and reference signals are available on the market, for example a microprocessor Intel 8085.

Without further analysis, the foregoing will so fully reveal the gist of the present invention that other can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Torque transmitting apparatus comprising and adjustable electric motor; a first rotary member driven by said motor; a second rotary member coaxial with said first member; a photoelectronic detector including a radiation source and a transducer disposed in the path of radiation issuing from said source and having an output arranged to transmit signals the characteristics of which vary as a function of changes of intensity of radiation which impinges upon said transducer; resilient means for transmitting torque between said members; first and second polarizing filters rotatable with said first and second members, respectively, and extending across said path to vary the intensity of radiation which impinges upon said transducer as a function of angular displacement of said members relative to each other against the resistance of said resilient means; and means for adjusting said motor in response to variations of the characteristics of said signals.

2. The apparatus of claim 1, wherein said detector is an analog detector.

3. The apparatus of claim 1, wherein said adjusting means includes a source of reference signals and means for comparing said reference signals with signals at the output of said transducer.

4. The apparatus of claim 3, wherein said motor is a reversible motor.

5. The apparatus of claim 4, wherein said adjusting means further comprises means for supplying to said motor d-c current at a potential which is proportional to the difference between the intensities of signals at said output and said reference signals.

6. The apparatus of claim 1, wherein said members assume predetermined angular positions with reference to each other when said motor is idle and said polarizing filters interrupt the propagation of radiation from said source to said transducer in said predetermined positions of said members.

7. The apparatus of claim 6, wherein said motor is a reversible d-c motor and said adjusting means includes a source of reference signals, means for comparing the characteristics of said reference signals with the characteristics of signals at the output of said transducer, and means for supplying current to said motor at a rate which is proportional to the difference between the characteristics of signals at said output and of said reference signals, the intensity of signals at said output being zero when said filters interrupts the propagation of radiation to said transducer.

8. The apparatus of claim 1, wherein said members include flanges and said filters are provided on the flanges of the respective members.

9. The apparatus of claim 8, wherein said member have neighboring end portions and said flanges are provided on the end portions of the respective members.

10. The apparatus of claim 9, wherein said resilient means comprises a torsion spring having a first end portion secured to one of said flanges and a second end portion secured to the other of said flanges.

11. The apparatus of claim 10, wherein said torsion spring is a coil spring.

12. The apparatus of claim 1, further comprising means for limiting the angular movability of said members and said filters relative to each other.

13. The apparatus of claim 12, wherein said limiting means includes means for limiting the angular movability of said members relative to each other to less than 180°.

14. The apparatus of claim 13, wherein said limiting means comprises means for limiting the angular movability of said members relative to each other to less than 91°.

15. The apparatus of claim 12, wherein said members having confronting flanges and said limiting means is provided on said flanges.

16. The apparatus of claim 15, wherein said limiting means comprises a projection provided on one of said flanges and spaced apart from the common axis of said members, and an arcuate recess provided in the other of said flanges and receiving said projection.

17. The apparatus of claim 16, wherein said recess extends along an arc of less than 91° and has a center of curvature on the common axis of said members.

* * * * *